E. E. WEMP.
VEHICLE SUSPENSION.
APPLICATION FILED MAR. 7, 1914.
1,142,468.
Patented June 8, 1915.
2 SHEETS—SHEET 2.
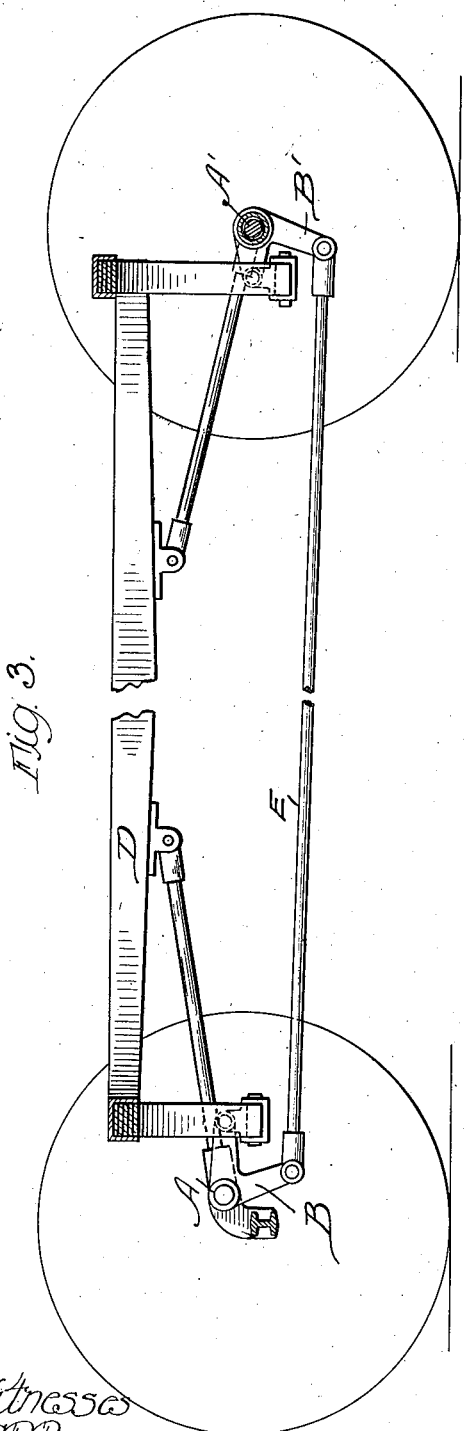
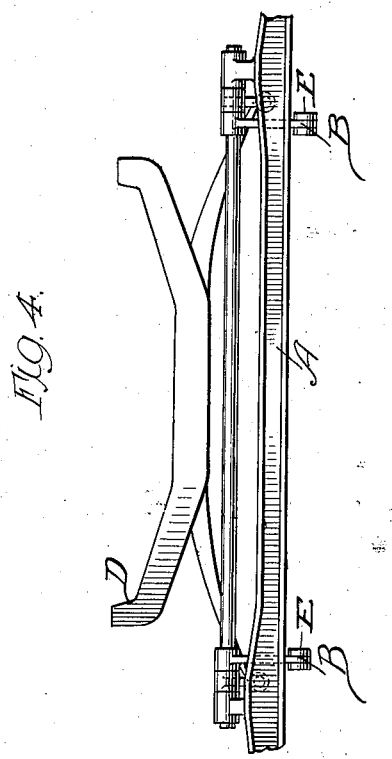

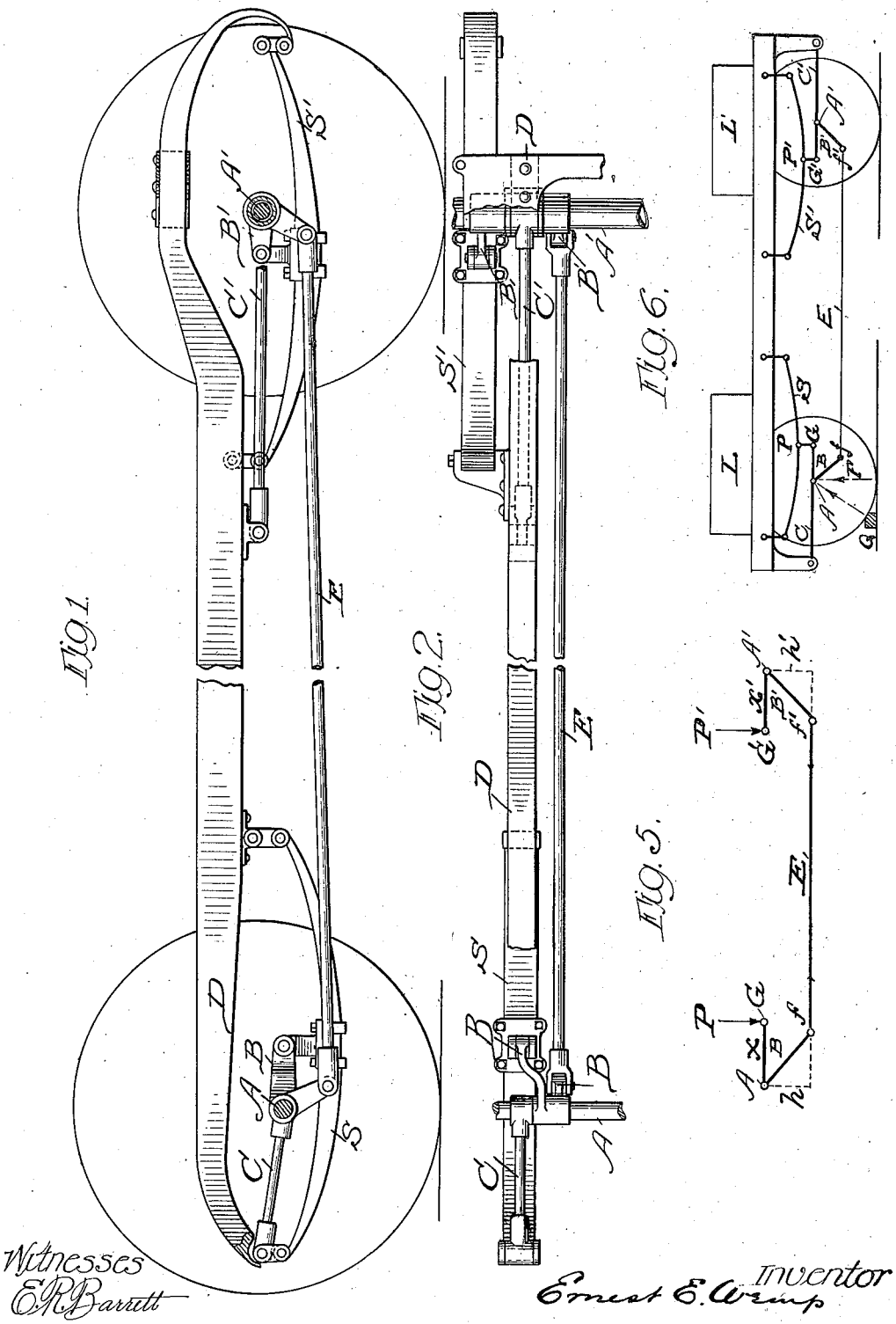

UNITED STATES PATENT OFFICE.

ERNEST E. WEMP, OF PONTIAC, MICHIGAN.

VEHICLE SUSPENSION.

1,142,468.   Specification of Letters Patent.   Patented June 8, 1915.

Application filed March 7, 1914. Serial No. 823,075.

*To all whom it may concern:*

Be it known that I, ERNEST E. WEMP, citizen of the United States, residing at Pontiac, county of Oakland, State of Michigan, have invented a certain new and useful Improvement in Vehicle Suspension, and declare the following to be a full, clear, and exact description of the same, such as will enable others skilled in the art to which it pertains to make and use the same, reference being had to the accompanying drawings, which form a part of this specification.

My invention relates to a suspension device for vehicle frames shown in the accompanying drawings and more particularly pointed out in the following specification and claims.

A roadway is made up of a number of elevations and depressions, or as they may be termed, of positive or negative obstructions, where we consider an elevation as positive and a depression as negative. Likewise, we may consider a "mean roadway" as a line midway between the positive and negative obstructions of the actual roadway, and relative to which there must be an equal number of such positive and negative obstructions.

The axles of any vehicle in passing along any roadway, must conform to the contour of it, and in so doing, there are set up in the axles, accelerating forces, which are either positive or negative, according to the obstructions encountered. These accelerating forces in turn are transmitted to the vehicle springs, and so to the passenger-carrying frame of the vehicle.

In ordinary vehicular construction the springs are attached directly to the front and rear axles respectively of the vehicle, and any forces imparted to the axles from roadway obstructions, must be absorbed by the acceleration of the mass of the frame which is supported by the axle receiving the shock. For example: if the front wheels of a vehicle strike an elevation or positive obstruction, a positive accelerating force is created in the front axle, which is transmitted to the front end of the vehicle frame through the springs, and must be absorbed by the acceleration of the mass of the frame supported by the front axle only. Similarly, if a negative obstruction is encountered by the front wheels only, the shock must be absorbed by the negative acceleration of the mass of the frame supported by the front axle only. Likewise, if an obstruction (either positive or negative) is encountered by the rear wheels only, the shock must be absorbed by the acceleration of the mass of the frame supported by the rear axle only.

One of the objects of my invention is to provide a suspension means whereby any shock force, either positive or negative, is transferred equally to the front and rear of the frame, and is absorbed by the acceleration of the whole mass of the vehicle frame.

The means employed, I designate as a "balance" suspension.

In the drawings accompanying this specification:—Figure 1 is a sectional elevation of an automobile frame indicating the balance suspension installed in a vehicle employing longitudinally disposed springs. Fig. 2 is a fragmentary plan view of one side of the frame shown in Fig. 1. Fig. 3 is a sectional elevation of a fragmentary portion of an automobile frame indicating the balance suspension device applied to a vehicle employing transverse springs. Fig. 4 is an end elevation of the frame shown in Fig. 3. Figs. 5 and 6 are diagrammatic views.

Referring now to the letters of references placed upon the drawings:—A and A′ denote the front and rear axles of a vehicle. B and B′ are bell crank levers respectively pivoted to the axles A and A′.

C and C′ are radius rods attached from the front and rear axles to the frame D.

E is a drag-link connecting the lower arms of the bell-crank levers B and B′ together.

S, S′ are the vehicle springs engaged to the frame and respectively connected with the other arm of the bell crank levers.

Attention is now directed to Fig. 5 of the drawings:—Consider bell crank levers B and B′ rotatably mounted upon fulcrums A and A′, and connected at $f$ and $f'$ by drag link E. If any force P be applied at G, the turning moment at $$f = \frac{Px}{h}$$

where $x$ and $h$ are perpendiculars respectively to P—G and $f$—$f'$, through A; similarly, if any force P' be applied at G', the turning moment at $$f' = \frac{P'x'}{h'};$$

if the system be in equilibrium, then the moment at F=moment at $f'$, and $$\frac{Px}{h} = \frac{P'x'}{h'}.$$

Any change in the forces P and P' will cause the bell cranks to rotate until the equation $$\frac{Px}{h} = \frac{P'x'}{h'}$$

satisfies, and the system is again in static equilibrium.

As applied to a vehicle, (see Fig. 6) A and A' represent the front and rear axles respectively; G and G' the points of application of the frame load. The horizontal reactions of the forces $f$ and $f'$ are provided by radius rods C and C' attached from the front and rear axles to the frame, or supplied by mounting one end of each front and rear spring with a pivotal connection to the frame instead of the ordinary shackle connection.

In striking an obstruction such as Q, the front axle is vertically accelerated with a force F; this force F is resisted at G by the inertia of the mass L, creating an unbalanced force at $f$, which force is transmitted through drag-link E to $f'$, and so through the bell crank B' to G'. There it is resisted by the inertia of the mass L'. The force $f$ is therefore transmitted equally to both axles and is absorbed by the acceleration of the whole mass of the frame. If the obstruction in Q be negative, the resulting acceleration in the frame is of the same magnitude, but opposite in sign.

As before stated, the roadway is composed of an equal number of positive and negative obstructions; it, therefore, follows that 50% of the obstructions simultaneously struck by the front and rear axle, must be opposite in sign, and since each shock force is transmitted equally to both axles, it follows that those forces of opposite sign must counteract each other and the resulting acceleration to the frame be materially lessened; in fact, if the front and rear axles receive simultaneous shocks that are opposite in sign, and these create equal and opposite accelerating forces, the resultant acceleration to the frame will be the algebraic sum of the two, or zero. This phase of vehicle suspension of causing road shocks of opposite sign to counteract each other, and thus maintain an easier riding platform, is one of the novel features of the invention.

Another phase of the suspension that is novel, lies in the fact that since the shock forces are always equally transmitted to both axles, the resulting accelerating force to the frame (either positive or negative) is of the same magnitude and sign at both axles, and the result is a riding platform having a parallel movement to the mean roadway, eliminating the disagreeable pitching movement of the ordinary suspended vehicle platform.

Having shown that any shock force is transmitted equally to both axles, and consequently to both ends of the frame,—it is very easy to show the frame acceleration from any shock force through either axle is only half as great as in a vehicle having the ordinary spring suspension.

Let F equal any accelerating forces—positive or negative—; M equals mass of car above the springs. A equals acceleration, F equals MA, or A equals $\frac{F}{M}$ in a "balance" suspension vehicle.

In an ordinary suspension the shock at either axle is absorbed by a mass $\frac{M}{2}$, considering that the mass is equally supported by both axles.

$$\text{Then } F = \frac{MA}{2}, \text{ or } A = \frac{2F}{M}.$$

The acceleration, therefore, is in the ratio of $$\frac{F}{M} : \frac{2F}{M},$$

or ratio of 1:2.

Therefore the acceleration of the frame due to any road shock in a "balance" suspension vehicle is one half as great as in the ordinary suspension, and the riding qualities are improved in the same ratio.

Having thus described my invention, what I claim is:—

1. In a vehicle, a load carrying platform, a front and a rear axle, front and rear springs connected to the platform, rotatable means having connection with each axle and the corresponding spring, a connection between said rotatable means, and a connection between each axle and the platform.

2. In a vehicle, the frame, a front and rear axle, bell cranks respectively pivoted to the front and rear axles, drag-links connecting one arm of the front bell crank with an arm of the rear bell crank, and front and rear springs connected with the respective bell cranks and to the frame.

3. In a vehicle, the frame, a front and rear axle, bell cranks respectively pivoted to the front and rear axles, drag-links connecting one arm of the front bell crank with an arm of the rear bell crank, front and rear springs connected with the respective bell cranks and to the frame, and radius rods attached from the front and rear axles to the frame.

4. In a vehicle, the frame a front and rear axle, bell cranks respectively pivoted to the front and rear axles, transversely disposed springs respectively connected with an arm of each front bell crank and with the frame,—and with an arm of each rear bell crank and with the frame, and drag links respectively connecting an arm of each front bell crank with an arm of each rear bell crank.

5. In a vehicle, a load carrying platform, front and rear axles, springs at each end of the platform, bell crank levers at each end of the vehicle having connection with the platform and operable to provide variable unbalanced opposing forces, and means co-operating with the bell crank levers and the platform whereby the opposing forces counteract each other and produce equilibrium.

In testimony whereof, I sign this specification in the presence of two witnesses.

ERNEST E. WEMP.

Witnesses:
JOEL L. WARDELL,
T. J. TURK.